(12) United States Patent
Yoshikawa

(10) Patent No.: US 7,142,276 B2
(45) Date of Patent: Nov. 28, 2006

(54) LCD DEVICE HAVING A SMALLER LEVEL DIFFERENCE

(75) Inventor: Tae Yoshikawa, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 0 days.

(21) Appl. No.: 10/848,716

(22) Filed: May 19, 2004

(65) Prior Publication Data
US 2004/0239857 A1 Dec. 2, 2004

(30) Foreign Application Priority Data
May 27, 2003 (JP) .............. 2003-149482

(51) Int. Cl.
G02F 1/1345 (2006.01)
(52) U.S. Cl. .............. 349/152; 349/149; 349/150; 349/151
(58) Field of Classification Search .......... 349/139, 349/149, 152
See application file for complete search history.

(56) References Cited

U.S. PATENT DOCUMENTS 6,839,120 B1 * 1/2005 Choo et al. ............. 349/152
2002/0033918 A1 * 3/2002 Shigeno et al. ............ 349/114
2003/0086046 A1 * 5/2003 You ............................ 349/149

FOREIGN PATENT DOCUMENTS

| JP | 09-043629 | 2/1997 |
| JP | 2001-311963 | 11/2001 |
| KR | 2001-66244 | 11/2001 |

* cited by examiner

Primary Examiner—Andrew Schechter
Assistant Examiner—Lucy Chien
(74) Attorney, Agent, or Firm—Hayes Soloway P.C.

(57) ABSTRACT

The TFT substrate of an LCD device has an array of pixel electrodes defined by a plurality of signal lines and a plurality of scanning lines. Each terminal of the scanning lines includes a first metallic pattern, a second metallic pattern in contact with the first metallic pattern through a first via hole, and an ITO pattern in contact with the second metallic pattern through a second via hole. The ITO pattern has a width smaller than the width of the first via hole and larger than the second via hole, thereby providing the TFT substrate with a smaller level difference. The smaller level difference prevents the dust generated during a rubbing treatment from attaching onto the TFT substrate.

8 Claims, 7 Drawing Sheets

PRIOR ART

|  | SCANNING TERMINAL | SIGNAL TERMINAL | SCANNING LINE | SIGNAL LINE | PIXEL ELECTRODE |
|---|---|---|---|---|---|

PRIOR ART

FIG. 5

PRIOR ART

FIG. 6

PRIOR ART

FIG. 7A

PRIOR ART

FIG. 7B

PRIOR ART

FIG. 8A

PRIOR ART

FIG. 8B

PRIOR ART

LCD DEVICE HAVING A SMALLER LEVEL DIFFERENCE

BACKGROUND OF THE INVENTION (a) Field of the Invention

The present invention relates to a liquid crystal display (LCD) device and, more particularly, to an LCD device having a smaller level difference on the surface of an active-matrix substrate and capable of preventing attachment of dust onto the surface of the active-matrix substrate.

(b) Description of the Related Art

LCD devices have been increasingly used as flat-panel display devices in, for example, computer systems and television sets. Among other LCD devices, an active-matrix mode LCD (AM-LCD) device has advantages of higher-speed response and suited to incorporation of a larger number of pixels, improvement of image quality, increase of panel size and improvement of color quality.

Figure 3:
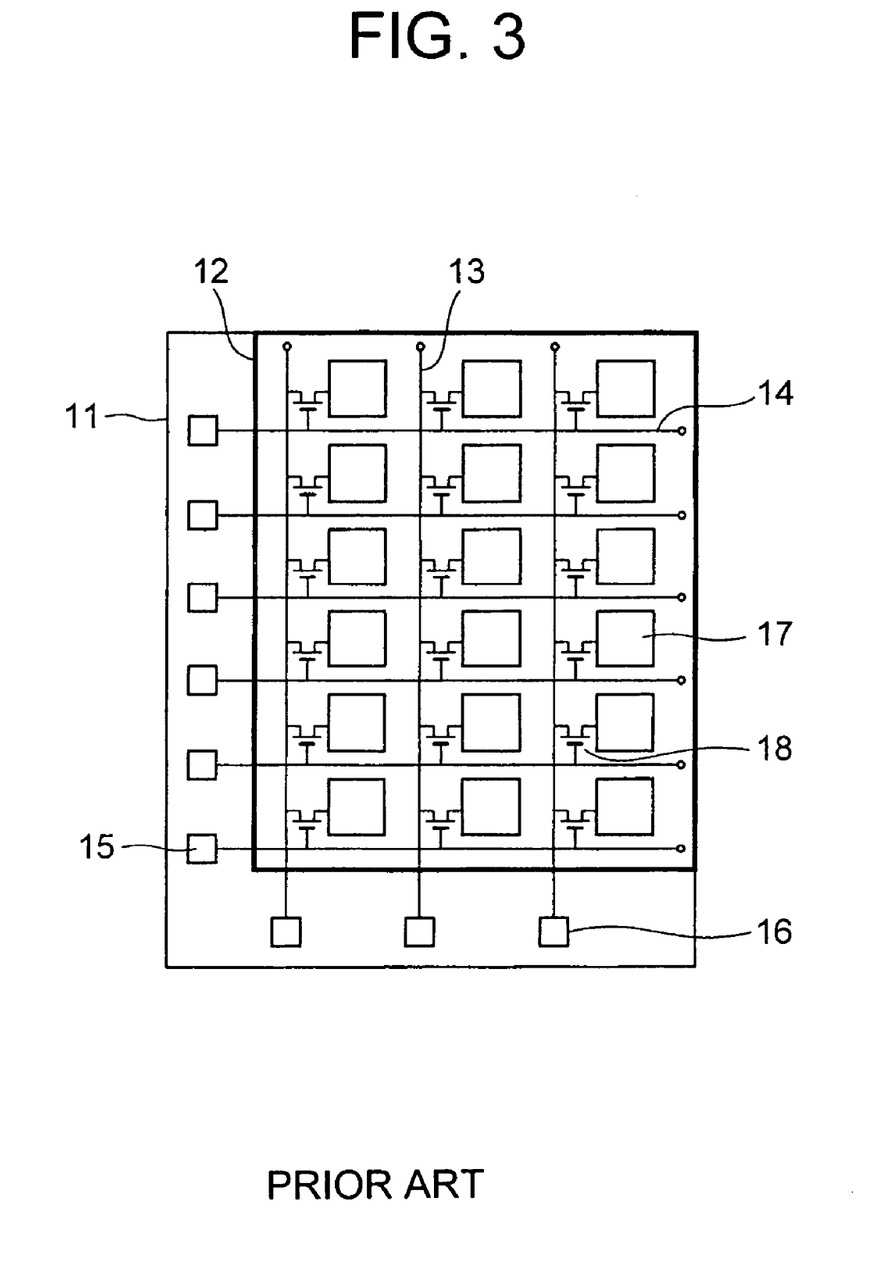
FIG. 3 is a schematic top plan view of a typical LCD device.

FIG. 3 depicts the schematic configuration of a typical (conventional) AM-LCD device in a top plan view, wherein a TFT substrate (active-matrix substrate) 11 and a counter substrate 12 sandwich therebetween a liquid crystal (LC) layer. The TFT substrate 11 mounts thereon a plurality of signal lines 13 extending parallel to one another, and a plurality of scanning lines 14 extending perpendicular to the signal lines 13. A plurality of pixel electrodes 17 each associated with a TFT (thin film transistor) 18 are disposed in a matrix at the intersections between the signal lines 13 and the scanning lines 14.

At the ends of the signal lines 13, there are provided respective signal terminals 16, whereas there are provided scanning terminals 15 at the ends of the respective scanning lines 14. The signal terminals 16 and the scanning terminals 15 are used for electrical connection to terminals of a flexible wiring board and bumps of a driving circuit, and electrical contact with signal pins of a probe card used for delivery of test driving signals during a product test. The counter substrate 12 mounts thereon a common electrode, color filters and an orientation film, which are not specifically depicted in the drawing. In an alternative, the common electrode may be provided on the TFT substrate.

Figure 4A:
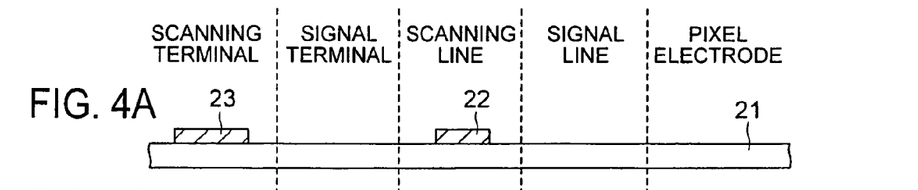
FIGS. 4A to 4F are sectional views of the typical LCD device for consecutively showing the steps of a fabrication process for manufacturing the LCD device.
Figure 4B:
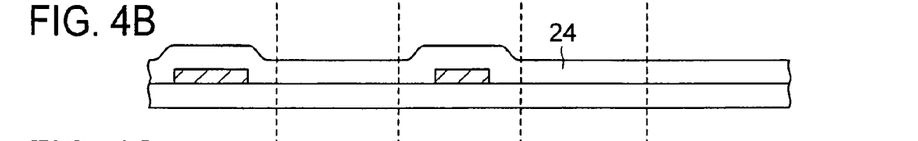
Figure 4C:
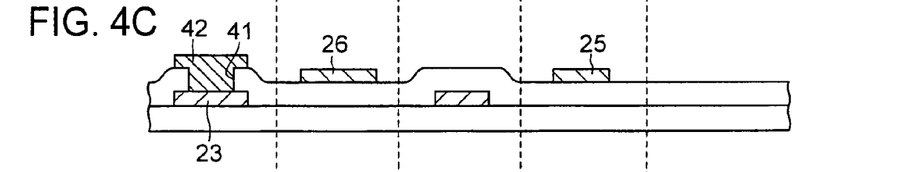

FIGS. 4A to 4F consecutively show steps of a fabrication process for manufacturing the TFT substrate in the LCD device of FIG. 3, wherein the areas for the scanning terminals, signal terminals, scanning lines, signal lines and pixel electrodes are separately depicted, as specified so in the drawing. A first metallic film is formed on a transparent substrate, such as made of glass, and subjected to patterning to form the scanning lines 22 and first metallic film patterns 23 of the scanning terminals (FIG. 4A), followed by depositing a first dielectric film 24 over the entire area (FIG. 4B).

Figure 4D:
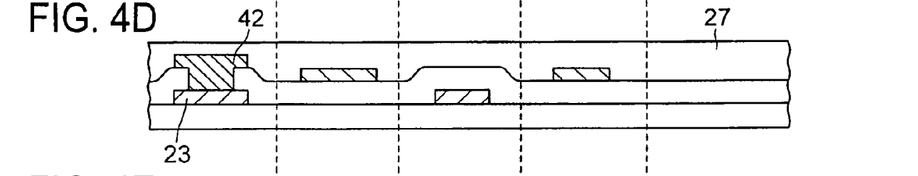
Figure 4E:
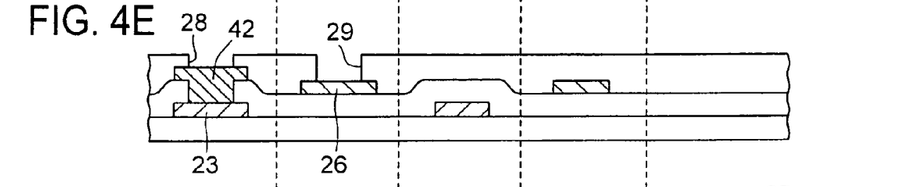

Subsequently, the first dielectric film 24 is subjected to patterning to form first via holes 41 exposing therefrom the first metallic film patterns 23 of the scanning terminals 23. A second metallic film is then deposited and subjected to patterning to form the signal lines 25, signal terminals 26, and second metallic film patterns 42 of the scanning terminals (FIG. 4C), followed by depositing thereon a second dielectric film 27 over the entire area (FIG. 4D). Thereafter, second via holes 28 and 29 are formed in the second dielectric film 27 to expose therethrough the signal terminals 26 and the second metallic film patterns 42 of the scanning terminals (FIG. 4E).

Figure 4F:
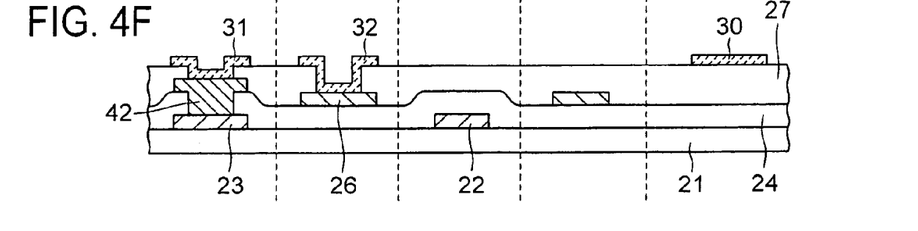

A transparent conductive film is then deposited thereon over the entire area, followed by patterning thereof to form transparent pixel electrodes 30 as well as transparent terminals 31 and 32 on the second metallic film patterns 42 of the scanning terminals and the signal terminals 26 (FIG. 4F). Thereafter, an orientation film is formed on the display area and subjected to a rubbing treatment to form scratches thereon aligned in one direction. The scratches on the orientation film have a function of aligning the axes of LC molecules in the LC layer in a specified initial direction. It is to be noted that the process for forming the TFTs is omitted herein for description, taken in consideration that the TFTs are not important elements in the feature of the present invention and may be formed using a conventional technique.

Figure 5:
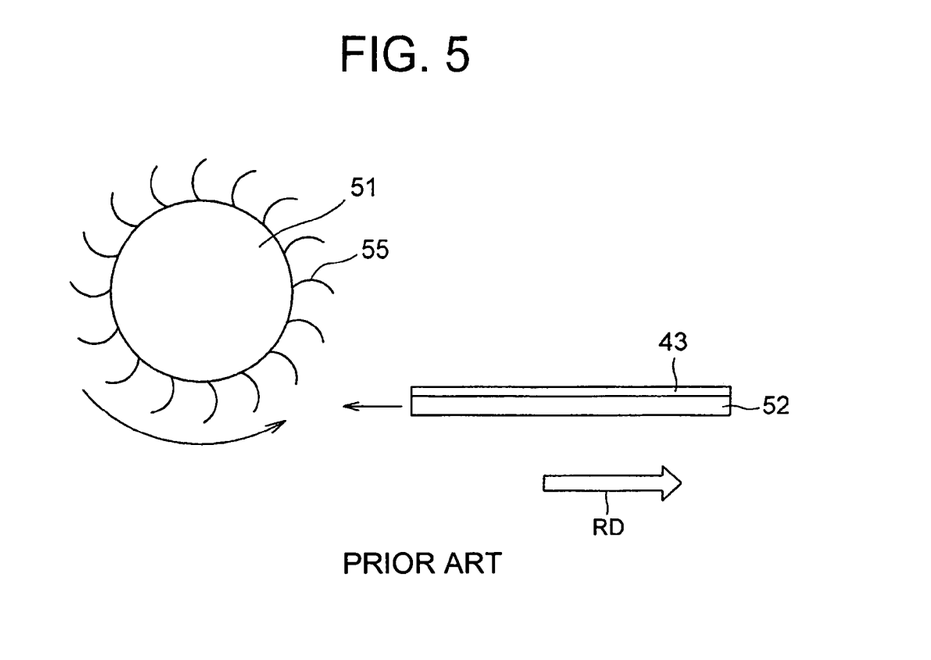
FIG. 5 is a schematic sectional view showing the rubbing treatment conducted to the TFT substrate shown in FIG. 3.

FIG. 5 schematically shows the rubbing treatment for the orientation film. The rubbing treatment is such that a rubbing roller 51 attached with a brush (or rubbing cloth) 55 is guided to slide on the orientation film 43 formed on the substrate 52, wherein the rubbing roller 51 is rotated to thereby form scratches extending in one direction on the surface of the orientation film 43. The rubbing roller 51 rotates in a counter-clockwise direction, the substrate 52 moves toward the left in the drawing, and thus the rubbing treatment is conducted in the direction of arrow RD, i.e., from the left to the right of the substrate 52 in the drawing.

The rubbing treatment generates file dust (or swarfs) from the orientation film 43 and fabric dust (or flocks) from the bristles of the rubbing cloth 55. The rubbing treatment conducted on a plurality of substrates in a single continuous step causes the file dust and fabric dust to be carried from the substrate at which the dust is generated toward the subsequent substrates. The dust thus carried is attached onto the substrates, especially in the surface area of the substrate 52 having a level difference, such as formed at the periphery of a depression or via hole.

Figure 6:
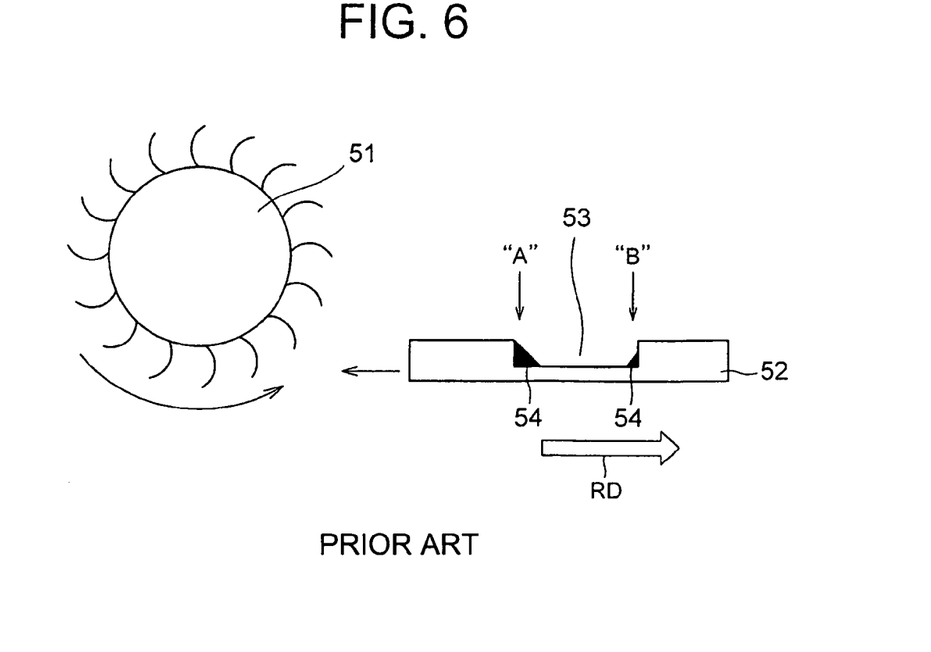
FIG. 6 is a schematic sectional view showing the dust attached onto the TFT substrate during the rubbing treatment.

FIG. 6 shows an example of the dust attached onto the level differences on the surface of a substrate 52. The rotational direction of the rubbing roller 51 and the direction of the movement of the substrate 52 generally causes the dust 54 to be attached onto the steps of a depression 53, such as a leading step "A" and a trailing step "B", as viewed in the direction RD of the rubbing treatment, of the depression 53 as shown in FIG. 6. It is to be noted that the amount of dust 54 attached onto the trailing step "B" of the depression 53 is smaller than the amount of dust 54 attached onto the leading step "A", because the dust 54 attached onto the trailing step "B" is more likely to be removed by the bristles of the rubbing cloth 55 compared to the dust 54 attached onto the leading step "A". This means a smaller level difference should be formed more preferably at the leading step "A" compared to the trailing step "B" to efficiently reduce the amount of dust captured on the level differences.

Figure 7A:
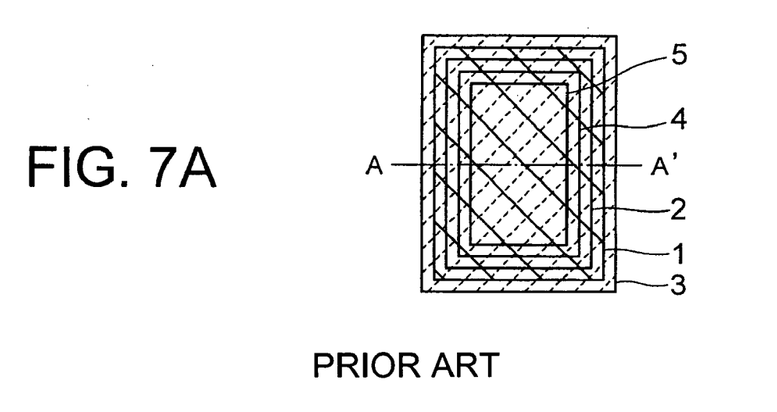
FIGS. 7A and 7B show the structure of a terminal in a conventional LCD device.
Figure 7B:
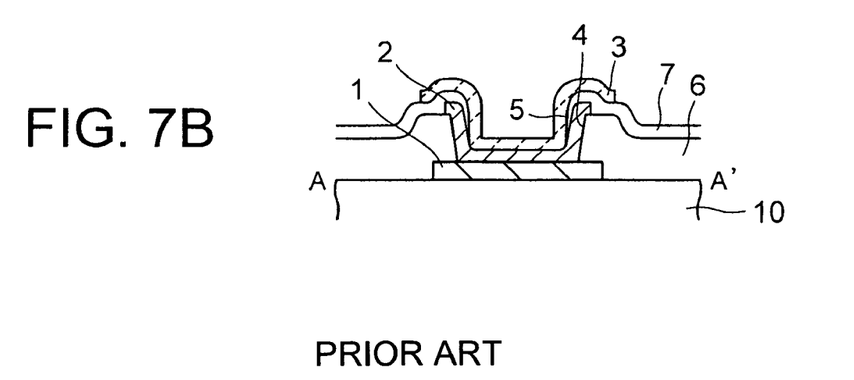

FIG. 7A shows a conventional structure of the vicinity of a scanning terminal formed on the substrate in a top plan view, and FIG. 7B shows the scanning terminal in a sectional view taken along line A–A' in FIG. 7A. The layer structure of the scanning terminal and the vicinity thereof includes a first metallic film pattern 1 (23 in FIG. 4F), first dielectric film 6 (24 in FIG. 4F), second metallic film pattern 2 (42 in FIG. 4F), second dielectric film 7 (27 in FIG. 4F) and ITO film pattern 3 (31 in FIG. 4F), which are consecutively deposited on the substrate 10 (21 in FIG. 4F). The first dielectric film 6 and second dielectric film 7 have therein first via hole 4 and second via hole 5, respectively, for allowing electric connection between the first metallic film pattern 1 and the second metallic film pattern 2 and between the second metallic film pattern 2 and the ITO film pattern 3, respectively. In FIG. 7A, the order of arrangement as viewed from outside the terminal is such that the edge of the ITO film pattern 3, the edge of the first metallic film pattern 1, the edge of the second metallic film pattern 2, the periphery (inner wall) of the first via hole 4 and the periphery of the second via hole 5 are consecutively arranged.

Figure 8A:
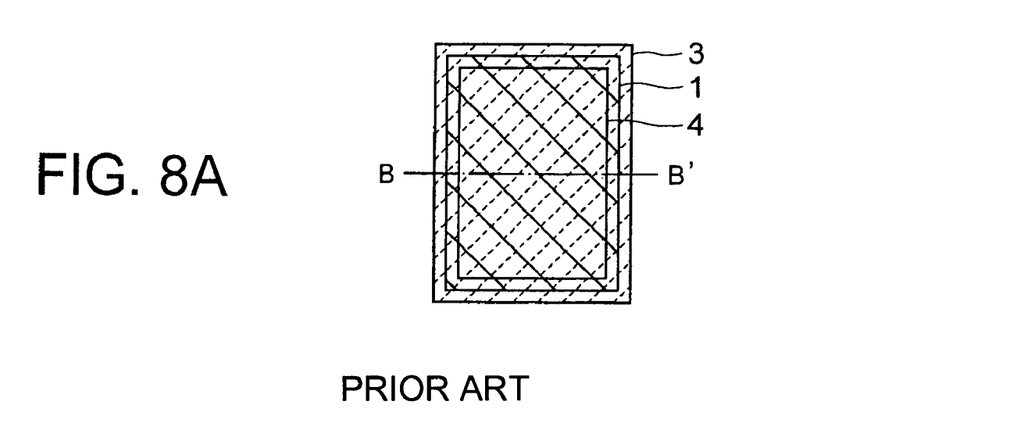
FIGS. 8A and 8B shown the structure of a terminal in another conventional LCD device.
Figure 8B:
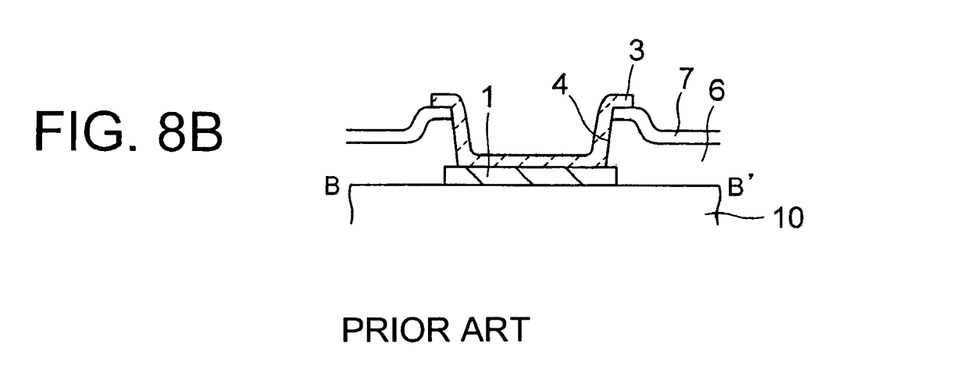

FIGS. 8A and 8B show the structure of the vicinity of another conventional terminal, similarly to FIGS. 7A and 7B, respectively. The layer structure of the terminal and the vicinity thereof includes the first metallic film pattern 1, first dielectric film 6, second metallic film pattern 7 and ITO film pattern 3, which are consecutively deposited on the substrate 10, wherein the first and second dielectric films and 7 have a common first via hole 4. In FIG. 8A, the order of arrangement as viewed from outside the terminal is such that the edge of the ITO film pattern 3, the edge of the first metallic film pattern 1, and the periphery of the first via hole 4 are consecutively arranged. This structure of the terminal simplifies the fabrication process compared to the structure shown in FIG. 7.

In the above structures of the scanning terminals shown in FIGS. 7A and 7B and FIGS. 8A and 8B, since the periphery of the via hole of the first dielectric film 6 roughly or accurately coincides with the periphery of the via hole of the second dielectric film 7, the level difference formed in the surface of the ITO film pattern 3 is equivalent to the sum of the thicknesses of the first dielectric film 6 and the second dielectric film 7 and thus is relatively large. This causes the amount of dust attached onto the steps formed at the scanning terminals to be large. The dust attached onto the substrate may enter the display area during or after the assembly of the LCD device, thereby degrading the image quality of the LCD device.

For reducing the amount of dust attached onto the surface of the TFT substrate, Patent Publication JP-A-2001-311963 describes a technique wherein the level difference on the surface of the TFT substrate is reduced by providing an equalization film in via holes through which the switching devices are connected to the respective pixel electrodes (FIG. 1 in the publication).

For reducing the amount of dust attached onto the surface of the orientation film, Patent Publication JP-A-1997-43629 describes another technique wherein dummy electrodes are disposed outside the display area to capture therein the fabric dust carried during the rubbing treatment and prevent the fabric dust from entering the display area of the subsequent substrates (FIG. 1 in the publication).

The structure described in JP-A-2001-311963 cannot be applied to the terminal of an LCD device wherein the topmost ITO film pattern is electrically connected to the bottom metallic film pattern, because the described structure uses an organic insulator film between the ITO film pattern and the bottom metallic film pattern for reducing the level difference.

The structure described in JP-A-1997-43629 prevents the dust from attaching onto the display area in the LCD device, and not onto the terminal, although it may reduce the total amount of the dust attached. In addition, the space for the dummy electrodes increases the marginal area of the substrate other than the display area.

SUMMARY OF THE INVENTION

In view of the above problems in the conventional techniques, it is an object of the present invention to provide an LCD device which is capable of reducing the level difference in the surface of the active-matrix substrate to reduce the amount of dust attached onto the step of a level difference on the active-matrix substrate, without incurring an increase of the size and degradation of the performance of the LCD device.

The present invention provides a liquid crystal display (LCD) device including an active-matrix substrate and a counter substrate sandwiching therebetween a liquid crystal (LC) layer, the active-matrix substrate including a transparent insulator substrate, a plurality of signal lines extending parallel to one another on the transparent substrate, a plurality of scanning lines extending parallel to one another and perpendicular to the signal lines, a plurality of pixel electrodes arranged in vicinities of intersections between the signal lines and the scanning lines, a plurality of terminals connected to the signal lines and the scanning lines, and an orientation film overlying the pixel electrodes, at least one of the terminals having a layer structure including a first metallic film pattern formed on the transparent insulator substrate, and a transparent conductive film pattern electrically connected with first metallic film pattern through first and second via holes of the first and second dielectric films, the transparent conductive film pattern having an edge, at least a portion of which is located inside of the first via hole and outside of the second via hole as viewed perpendicular to the active-matrix substrate.

In accordance with the LCD device of the present invention, since the second via hole is smaller than the first via hole, and the transparent conductive film has an edge portion between the first via hole and the second via hole, the level difference formed on the transparent conductive film is smaller compared to the conventional structure, whereby the dust captured by the level difference of the terminal during the rubbing treatment of the orientation film is reduced.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings, wherein similar constituent elements are designated by similar reference numerals throughout the drawings.

Figure 1A:
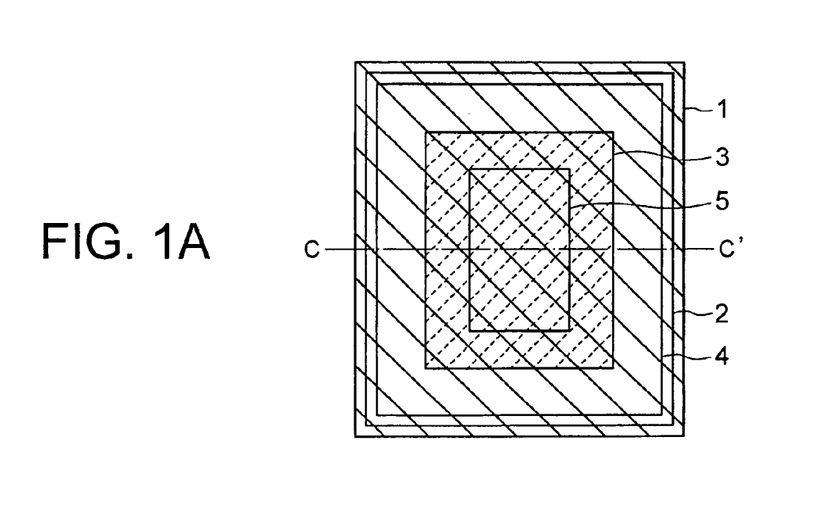
FIGS. 1A and 1B are top plan view and sectional view, respectively, of the vicinity of a terminal in an LCD device according to a first embodiment of the present invention.
Figure 1B:
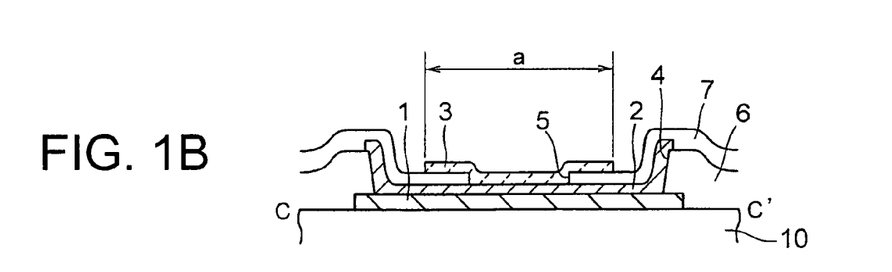

Referring to FIGS. 1A and 1B, there is shown the structure of a scanning terminal in an LCD device according to a first embodiment of the present invention. The LCD device shown in these figures is an AM-LCD device, the overall configuration thereof being similar to that shown in FIG. 3. More specifically, as shown in FIG. 3, the LCD device of the present embodiment includes a TFT substrate 11 and a counter substrate 12 sandwiching therebetween an LC layer.

The TFT substrate 11 mounts thereon a plurality of signal lines 13 extending parallel to one another, and a plurality of scanning lines 14 extending perpendicular to the signal lines 13. A plurality of pixel electrodes 17 each associated with a TFT 18 are disposed in a matrix at the intersections between the signal lines 13 and the scanning lines 14.

At the ends of the signal lines 13, there are provided respective signal terminals 16, whereas there are provided scanning terminals 15 at the ends of the respective scanning lines 14. The signal terminals 16 and the scanning terminals 15 are used for electrical connection to terminals of a flexible wiring board and bumps of a driving circuit, and electrical contact with signal pins of a probe card used for delivery of driving signals during a product test. The counter substrate 12 mounts thereon, a common electrode, color filters and an orientation film, which are not specifically depicted in the drawing.

The LCD device according to the present embodiment features the structure of terminals such as scanning terminals, as will be described hereinafter. It is to be noted that the structure of the terminal in the present embodiment may be applied to the scanning terminals or signal terminals, so long as the terminal in the present embodiment includes first and second metallic film patterns and transparent conductive film pattern.

As shown in FIG. 1B, the layer structure of the terminal and the vicinity thereof includes a first metallic film pattern 1, a first dielectric film 6 having therein a first via hole 4 for exposing a portion of the first metallic film pattern 1, a second metallic film pattern 2 formed in the first via hole 4 to be in contact with the first metallic film pattern 1 through the first via hole 4, a second dielectric film 7 having therein a second via hole 5 for exposing a portion of the second metallic film pattern 2, and an ITO film pattern 3 in contact with the second metallic film pattern 2 through the second via hole 5. The ITO film pattern 3 has a peripheral area formed on the second dielectric film 7 and a central area in contact with the second metallic film 2 through the second via hole 5.

The second via hole 5 has a periphery significantly apart from the periphery of the first via hole 4, and is smaller in the area thereof compared to the conventional structure. The ITO film patterns 3 are formed to be in conformity with the pattern and pitch of the terminals of the driving circuit. The ITO film pattern 3 protrudes from the periphery of the second contact hole 5, and thus has a larger width "a" compared to the width of the second contact hole 5. The width "a" of the ITO film pattern 3, however, is smaller than the widths of the first metallic film pattern 1, first via hole 4 and second metallic film pattern 2. The ITO film pattern 3 has an edge at specified distances apart from the edges of the first metallic film pattern, 1 and second metallic film pattern and the periphery of the first via hole 4. The specified distances as used in this context mean the distances which allow the step formed by the first via hole 4 to be apart from the step formed by the second via hole 5 in the horizontal direction. Note that it is sufficient that at least one of the four edges of the ITO film pattern 3 be apart from the corresponding edges of the first metallic film pattern 1 and second metallic film pattern or the periphery of the first via hole 4.

Now, a fabrication process for manufacturing the LCD device having the terminal shown in FIGS. 1A and 1B will be described. The process itself in the present embodiment is generally similar to that described with reference to FIGS. 4A to 4F except for the structure of the vicinity of the scanning terminals. A metallic film is deposited on a transparent substrate such as made of glass, and subjected to patterning to form the scanning lines (14 in FIG. 3) and the first metallic film patterns 1 each constituting the terminal portion of the scanning terminal. Subsequently, the first dielectric film 6 is formed over the entire area, and subjected to etching to form the first via holes 4 in the first dielectric film 6, thereby exposing the portion of the first metallic film pattern 1.

Another metallic film is then deposited on the first dielectric film 6, and subjected to patterning to form the signal lines (14 in FIG. 3) and the second metallic film patterns 2 each constituting the terminal portion of the scanning terminal. Thereafter, the second dielectric film 7 is formed over the entire area, and subjected to etching to form the second via holes 5 having a smaller size compared to the first via hole 4, the second via holes 5 exposing therefrom portions of the second metallic film 2.

An ITO film is then formed over the entire area, and subjected to patterning to form pixel electrodes (17 in FIG. 3) and the ITO film patterns 3 each constituting a terminal portion of the scanning terminal. The ITO film pattern 3 has a width larger than the second via hole 5 and yet smaller than the first via hole 4. Subsequently, an orientation film is formed in the display area other than the area of the terminals including the signal terminals and scanning terminals. The orientation film is then subjected to a rubbing treatment for forming scratches thereon, which later align the axes of LC molecules in the LC layer in a specified direction.

It is to be noted that the process for forming the TFTs (switching devices) is omitted for description because the TFTs are not important elements in the feature of the present invention. The counter substrate 12 shown in FIG. 3 is obtained by forming common electrodes, color filters and orientation film on a transparent substrate, similarly to the conventional technique. The TFT substrate 11 and the counter substrate 12 thus prepared separately are disposed to sandwich therebetween an LC layer to complete an LCD panel. The common electrode may be disposed on the TFT substrate instead of the counter substrate.

It is also to be noted that if the signal lines are formed on the glass substrate 10 instead of the scanning lines, the signal terminals may have the structure shown in FIGS. 1A and 1B As described above, in the terminals for electric connection in the LCD device of the present embodiment, the level difference of the ITO film pattern 3 constituting the terminal portion substantially corresponds to only the thickness of the second dielectric film 7, and thus provides a smaller level difference on lo the TFT substrate 11, to thereby reduce the amount of dust attached onto the terminals during the rubbing treatment of the orientation film.

Figure 2A:
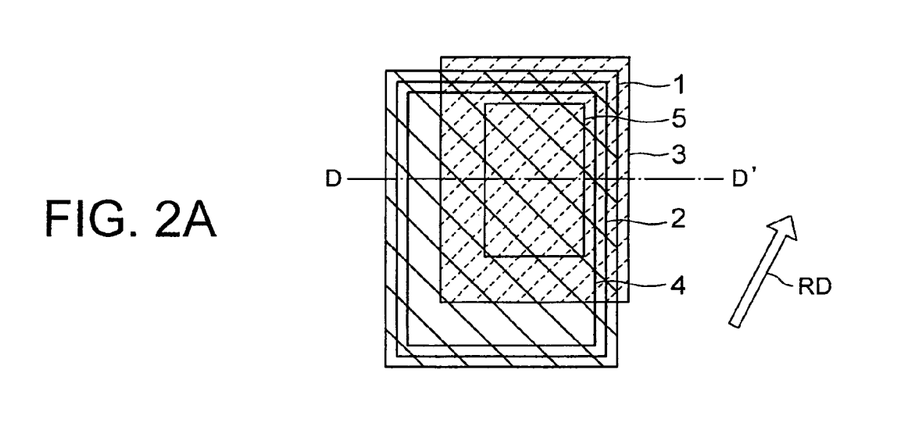
FIGS. 2A and 2B are top plan view and sectional view, respectively, of the vicinity of a terminal in an LCD device according to a second embodiment of the present invention.
Figure 2B:
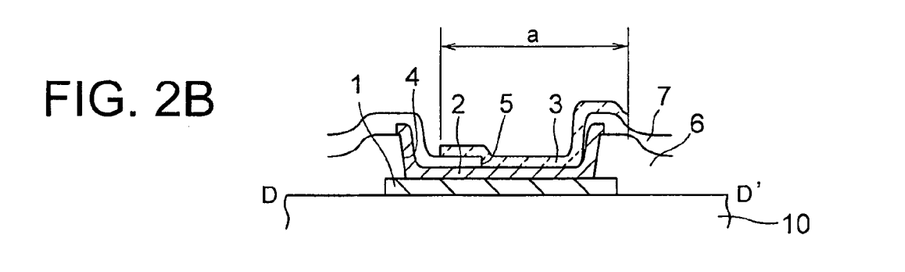

Referring to FIGS. 2A and 2B, there is shown the structure of the vicinity of a terminal in an LCD device according to a second embodiment of the present invention. The rubbing direction of the orientation film is shown by an arrow RD, which is directed from the bottom left to the top right, as viewed in FIG. 2A. The terminal shown in FIGS. 2A and 2B is similar to the terminal shown in FIGS. 1A and 1B except that the center of the second via hole 5 is deviated from the center of the first via hole 4 in the direction RD of the rubbing treatment, and that the ITO film pattern 3 is formed in the second via hole 5 and has four edges overlying the four edges of the second dielectric film 7 constituting the second via hole 5.

The ITO film patterns 3 are disposed to correspond to the pattern and pitch of the terminals of the driving circuit. The second via hole 5 is located within the area of the ITO film pattern 3. In addition, the leading edge of the first metallic film pattern 1, the leading periphery of the first via hole 4 and the leading edge of the second metallic film pattern 2 as viewed in the rubbing treatment conducted in the direction RD are disposed at specified distances apart from the leading edge of the ITO film pattern 3.

More specifically, the ITO film pattern 3 is deviated in the rubbing direction, wherein the ITO film pattern 3 has the leading edge disposed at a larger distance apart from the leading edge of the first via hole 4 at the terminal. This is because dust from the orientation film is more likely to stay at the leading step of the depression compared to the trailing step thereof in the rubbing treatment, as described before with reference to FIG. 6, and the larger distance between the leading edge of the ITO film 3 and the leading periphery of the first via hole 4 effectively prevents the attachment of the dust onto the leading step. The structure of the terminal in the present embodiment can be manufactured similarly to the terminal of the first embodiment.

According to the LCD device of the present embodiment, the area for the terminal including the first metallic film pattern, first via hole and second metallic pattern can be made smaller than the terminal in the first embodiment. This is especially suited to the case of a narrow pitch of the terminals of the driving circuit, and achieves advantages similar to those in the first embodiment depending on the situation of generation of the dust.

As detailed above, at least one of the embodiments of the present invention achieves the advantages of:

(1) a smaller amount of dust attached onto the step formed at the terminal, the dust including file dust generated from the orientation film and fabric dust generated from the rubbing cloth;
(2) a smaller area, or width "a", of the ITO film pattern, which is suited to the case of a narrow pitch of the terminals of the driving circuit; and
(3) larger areas for the first via hole and second via hole to reduce the contact resistance in the terminal.

Since the above embodiments are described only for examples, the present invention is not limited to the above embodiments and various modifications or alterations can be easily made therefrom by those skilled in the art without departing from the scope of the present invention. For example, the present invention is not limited to an AM-LCD device and applied any type of the LCD devices. The structures of the above embodiments may be applied to the structure shown in FIGS. 8A and 8B, by providing at least one of the edges of the second dielectric film 7 apart from the corresponding edge of the first dielectric film 6.

What is claimed is:

1. A liquid crystal display (LCD) device comprising an active-matrix substrate and a counter substrate sandwiching therebetween a liquid crystal (LC) layer, said active-matrix substrate comprising:

a transparent insulator substrate;
a plurality of signal lines extending parallel to one another on said transparent substrate;
a plurality of scanning lines extending parallel to one another and perpendicular to said signal lines;
a plurality of pixel electrodes arranged in vicinities of intersections between said signal lines and said scanning lines;
a plurality of terminals connected to said signal lines and said scanning lines, and an orientation film overlying said pixel electrodes, at least one of said terminals having a layer structure including a first metallic film pattern formed on said transparent insulator substrate;
a first dielectric film having a first via hole, said first dielectric film formed on said first metallic film pattern;
a second dielectric film having a second via hole; and
a transparent conductive film pattern electrically connected with said first metallic film pattern through first and second via holes of said first and second dielectric films,
wherein said second hole overlies said first hole and has a periphery different from that of said first hole, said transparent conductive film pattern having a central area and a peripheral edge; and
wherein at least a first portion of said peripheral edge is located inside of said first via hole, and a second portion of said peripheral edge is located outside of said second via hole as viewed perpendicular to said active-matrix substrate.

2. The LCD device according to claim 1, wherein said at least one of said terminals includes a second metallic film pattern disposed between said first metallic film pattern and said transparent conductive film pattern, said second metallic pattern being in contact with said first metallic pattern through said first via hole and with said transparent conductive film through said second via hole.

3. The LCD device according to claim 1, wherein said transparent conductive film pattern has a center substantially aligned with a center of said first via hole.

4. The LCD device according to claim 1, wherein said transparent conductive film pattern has a center deviated from a center of said first via hole.

5. The LCD device according to claim 4, wherein said transparent conductive film pattern has another portion protruding from or aligned with a periphery of said first via hole.

6. The LCD device according to claim 5, wherein said terminal has a surface having a smaller level difference near a leading edge of said transparent conductive film than near a trailing edge thereof as viewed in a rubbing treatment of said orientation film.

7. The LCD device according to claim 4, wherein said center of said transparent conductive film pattern is deviated from said center of said first via hole in a rubbing direction of said orientation film.

8. The LCD device according to claim 7, wherein said second via hole is deviated from said first via hole in said rubbing direction.

* * * * *